United States Patent [19]

Leopold, Jr.

[11] 3,814,466
[45] June 4, 1974

[54] SERVICE HEAD ADAPTER
[75] Inventor: Wilbur R. Leopold, Jr., Decatur, Ill.
[73] Assignee: Mueller Co., Decatur, Ill.
[22] Filed: July 10, 1972
[21] Appl. No.: 270,301

[52] U.S. Cl................. 285/55, 285/94, 285/246, 285/341, 285/348
[51] Int. Cl............................................ F16l 55/00
[58] Field of Search....... 285/15, 55, 331, 250, 246, 285/348, 341, 94

[56] References Cited
UNITED STATES PATENTS
| | | | |
|---|---|---|---|
| 1,980,389 | 11/1934 | Dennie | 285/246 |
| 3,244,438 | 4/1966 | Bucheit | 285/15 |
| 3,375,025 | 3/1968 | Engel | 285/15 |
| 3,596,933 | 8/1971 | Luckenbill | 285/246 |
| 3,700,268 | 10/1972 | Nielsen | 285/348 |

Primary Examiner—Dave W. Arola
Attorney, Agent, or Firm—Cushman, Darby & Cushman

[57] ABSTRACT

A service head adapter joint for connecting a new flareless plastic service pipe to a fitting, the new plastic service pipe being inserted through an existing service pipe, which may be metal, from the street main to the point of use for example a house. The existing service pipe while no longer functioning as a conduit for fluid still has utility as it protects the new plastic service pipe and is connected to the adapter joint. The fitting which is usually connected to the fluid distribution system of the house may be an elbow, tee, valve or another pipe extending into the house.

7 Claims, 4 Drawing Figures

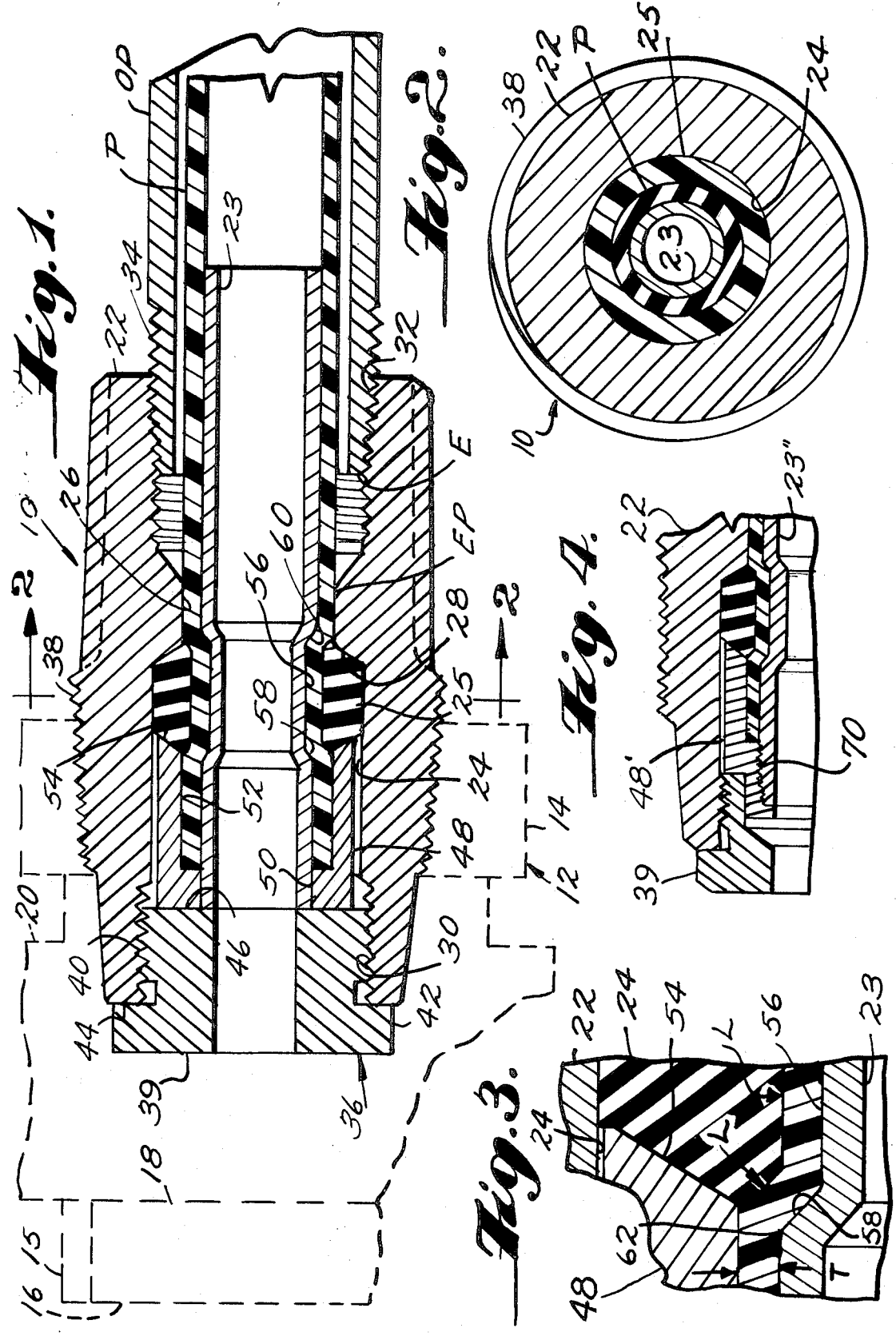

SERVICE HEAD ADAPTER

The present invention relates to an improvement in a service head adapter joint for connecting a new plastic service pipe to a fitting while utilizing the existing or old service pipe as shield or cover and as a means of laying the new pipe with a minimum of digging and, more particularly the invention is an improvement over the joint disclosed in U.S. Pat. No. 3,596,933 issued Aug. 3, 1971, to Lawrence F. Luckenbill and assigned to the same Assignee as this application, namely, Mueller Co., Decatur, Illinois. To the extent of the details of the joint *per se*, the aforementioned U.S. Pat. No. 3,596,933 is incorporated by reference pursuant to Section 608.01(p) of the Manual of Patent Examining Procedure.

BACKGROUND OF THE INVENTION

In recent years with the development of non-metallic plastic pipes of polyvinylchloride (PVC), polyethylene (PE), polybutylene (PB) and the like, public utilities for distribution of gas and water as well as chemical plants and the like have begun to extensively use such pipe in old installations as well as new installations. This invention relates primarily to the use of plastic pipes to replace worn-out existing pipes such as metal pipes or the like with the existing pipe still having a useful function.

In the past when an existing pipe needed replacement, it was dug from the ground and replaced by the new pipe. However, public utility companies and the like have found that it is cheaper and quicker to use the existing pipe to assist in laying the new plastic pipe without substantial digging, the existing pipe then functioning as a shield or conduit for the new plastic pipe. In this respect, the new plastic pipe is threaded through the existing pipe at its connection with the street main until an end portion of the same protrudes from the end of the existing pipe at the house location. The new plastic pipe was then connected to a fitting at the house with the old or existing pipe providing a shield or cover.

While joints such as those disclosed in U.S. Pat. No. 3,596,933 provide an excellent means of connecting a non-metallic flareless pipe to a fitting, the particular joint disclosed did not lend itself to utilization with an adapter head whereby the end of the existing pipe was also connected to the adapter head.

BRIEF SUMMARY OF THE INVENTION

The present invention relates to an improved service head adapter joint for connecting a new plastic service pipe to a fitting, the service head adapter joint permitting the use of the existing or old metallic service pipe as a shield for protecting the plastic pipe. Additionally, the old or existing service pipe provides a simple and inexpensive means of laying the new plastic service pipe from a main to the service such as a house or the like with a minimum of digging.

The improved service head adapter joint provides means for connecting it to the existing service pipe once the plastic service pipe has been telescopingly extended therethrough and the end portion projects therefrom. The service head adapter joint utilizes a joint incorporating the features of the common Assignee, Mueller Co.'s U.S. Pat. No. 3,596,933 which is incorporated by reference herein, but the present invention enables such a joint to be made up in a manner where the rigid sleeve element is carried by the follower means and is inserted into the plastic pipe during makeup.

The joint of the present invention relies on friction between the gasket seal and the pipe material for its high pullout resistance as well as on friction between the plastic pipe and the rigid sleeve element especially in the area of the recess means of the sleeve element. While the pullout resistance is maintained at a high level over the entire life of the joint, the joint is further protected by utilization of the old existing metal pipe which can take some loads from shifting ground.

DESCRIPTION OF THE DRAWINGS

FIG. 1 is a vertical sectional view through the service head adapter joint of the present invention and disclosing the joint as made up, the fitting to which the adapter head joint is attached, is disclosed diagrammatically in broken lines;

FIG. 2 is a cross-sectional view of the adapter head joint taken substantially on line 2—2 of FIG. 1;

FIG. 3 is an enlarged fragmentary sectional view illustrating the critical features of the joint *per se* and is similar to FIG. 7 in U.S. Pat. No. 3,596,933; and FIG. 4 is a fragmentary sectional view showing a slightly modified service head adapter joint wherein the rigid sleeve element is threaded into the follower means.

DETAILED DESCRIPTION OF THE INVENTION

Referring now to the drawings wherein like character or reference numerals represent like or similar parts, there is disclosed in FIG. 1 a service head adapter joint of the present invention generally designated at 10 for attaching a new non-metallic flareless plastic pipe P to a fitting 12 shown in broken lines. The plastic pipe P is shown within an existing or old pipe OP which is usually made of metal. When the existing pipe OP is worn out or is damaged, rather than dig the existing pipe OP out of the ground, the plastic pipe P is telescopingly threaded therethrough, for example, from the main toward the point of service until the plastic pipe P has its end portion EP projecting beyond the end E of the existing pipe OP. After the plastic pipe P has been connected to a curb stop or valve at the main, then its other end EP may be connected to the fitting 12.

The fitting 12 is diagrammatically shown as a tee having a threaded branch 14 for connection to the service head adapter joint 10, and an oppositely disposed branch 15 with an opening at 16 for receiving a threaded closure plug 18. A leg 20 of the fitting 12 is arranged to be connected to the pipe lines or meters (not shown) leading to within the house. While the fitting 12 is shown as a tee, it is, of course, within the scope of the invention for the fitting 12 to be an elbow, valve or stop, or another pipe, the element being provided with a ring nut for attachment to the service head adapter joint 10.

The service head adapter joint 10 broadly includes a hollow body member 22, follower means 36 movable relative to the body member 22 and a rigid tubular sleeve element 23 fixedly carried by the follower means and insertable into the end portion EP of plastic pipe P. The body member 22 and the follower means 36 define a variable compression chamber therebetween which houses an annular gasket seal 25 made of a substantially noncompressible deformable elastomeric material such as rubber, synthetic rubber, or the like.

The body member 22 has a bore 24 extending therethrough, the bore having an intermediate portion 26 of reduced diameter substantially equalling the outside diameter of the plastic pipe P and through which the end portion EP of the plastic pipe extends. A frusto-conical shoulder 28 which flares outwardly and faces toward the terminal end of end portion EP of plastic pipe P is provided between the reduced diameter of bore 24 at the intermediate portion 26 and the normal diameter of the bore 24. A more detailed description of the purpose of the frusto-conical shoulder 28 will follow later in the specification. Interior threads 30 and 32 are respectively provided at each end of the bore 24. Threads 32 are arranged to receive the threaded end of the existing or old pipe OP whereas the threads 30 at the other end of the body member 22 are utilized for advancing the follower means 36 as will be described later in the specification. Additionally, body member 22 is provided on its exterior with threads 38 which are arranged to cooperate with thread means of the fitting 12.

The follower means 36 includes a ring or follower nut 39 provided with exterior threads 40 for cooperating with the threads 30 of body member 22 and a sleeve-like member 48 movable axially by advancement of the nut. Additionally, the ring nut is provided with a radially extending shoulder 41 on its flange 42 which provides a stop means for abutting an end 44 of the body member 22. In other words, the ring or follower nut 39 can be threaded into the body member a predetermined distance when it then bottoms on the body member at 44. Ring or follower nut 39 is provided with a flat annular end surface 46 which abuts against the end of the sleeve-like member 48 which forms the second member of the follower means. The sleeve-like member 48 fixedly carries the rigid sleeve element 23 in its first bore 50 by a press fit or the like, the sleeve-like member 48 being provided with a second bore 52 substantially equal to the exterior diameter of the pipe P. The bore 52 provides with the exterior surface of the rigid sleeve member 23 a chamber for snugly receiving the end of the pipe P. Sleeve-like member 48 is provided at its inner end with a frusto-conical shoulder 54 facing the frusto-conical shoulder 28 and being oppositely disposed thereto. The shoulder 54 together with the shoulder 28 define the ends of a variable compression chamber which is trapezoidal in radial section. The gasket seal 25 is also trapezoidal in radial section and, thus, it will be apparent that when the follower nut 39 is rotated and advanced, it will axially advance the sleeve-like member 48 without rotation of the same and thereby reduce the volume of the compression chamber by reducing its axial length. This causes the annular gasket seal 25 to deform inwardly about the plastic pipe P.

Rigid sleeve element 23 fixedly carried by the sleeve member 48 has an exterior diameter equal to the inside diameter of the pipe P and is provided with recess means 56 of considerable axial extent intermediate its ends. The recess means 56 terminates in frusto-conical end walls 58 and 60 at the extremity of the overall axial extent of the same. Each of the walls 58 and 60 have a slope to the longitudinal axis of the sleeve element in the order of 45° which is the optimum slope to give good pullout resistance to the joint as described in the aforementioned U.S. Pat. No. 3,596,933. Additionally, at this time it will be noted that the frusto-conical shoulders 28 and 54 have angles to the longitudinal axis of the joint in the order of 30° as also described in the aforementioned U.S. Pat. No. 3,596,933.

The abutting surface between the ring or follower nut 39 and the sleeve-like member 48 are preferably coated with a lubricant material such as a dry, firm lubricant to reduce the friction between these two rotating parts and such a lubricant material may be Teflon, or molybdenum disulfide ($MOS_2$) in a binder such as an epoxy or alkyd resin paint or the like. As will now be evident upon makeup of the joint of the present invention as distinguished from the joint disclosed in the aforementioned U.S. Pat. No. 3,596,933, there is no relative rotation between the gasket seal 25 or plastic pipe P and the members forming the variable compression chamber. In other words, the sleeve-like member 48 as it moves towards the frusto-conical shoulder 28 of the body member 22 moves only in an axial direction with no rotation and while it moves, it carries with it the rigid sleeve element 23 this being moved in the interior of pipe P until the ring or follower nut 39 bottoms. When the ring or follower nut bottoms, the frusto-conical end walls 58 and 60 of the recess means 56 are positioned in relationship to the frusto-conical shoulders 54 and 28 just as described in detail in the aforementioned U.S. Pat. No. 3,596,933 incorporated by reference herein. As shown in FIG. 3 wherein the joint is made up, the frusto-conical end wall 54 has a projection of the same extending through the outer junction 62 of the recess means 56 of rigid sleeve element 23. The load L applied by the gasket seal 25 is perpendicular to the recess means even on the sloping end walls 58 and 60 and the thickness T of the plastic pipe P has not changed even though the plastic pipe has been deformed in the recess and this is because there is no extrusion of the plastic pipe.

FIG. 4 shows a slight modification of the present invention wherein the rigid sleeve member 23' instead of being press fit into the sleeve member 48' is threadedly received as indicated at 70.

To make the service head adapter joint 10 of the present invention the pipe P is first inserted through the existing or old pipe OP until its end portion EP projects well beyond the end E of the existing pipe OP. Then the body member 22 is threaded onto the threaded end 34 of the existing pipe OP and the fitting 12 is next threaded onto the body member 22. With the threaded plug 18 removed, the gasket seal 25 is inserted into the bore 24 until it abuts the frusto-conical shoulder 28. Once this is done, then the sleeve-like member 48 with the sleeve element 23 is inserted into the body member 22 with the sleeve element extending partially into the interior of the pipe. Of course, the gasket seal 25 will be in its relaxed position and will have an axial extent greater than the extent of the recess means 56 and the recess means 56 will not be far enough in at this stage of the makeup. Then the ring or follower nut 39 is threaded into the threads 40 with its end abutting the other end of the sleeve member 48. As the nut 39 is advanced, it will axially move the sleeve element 23 and sleeve-like member 48 until it bottoms against the end 44 of the member 22. At the point it bottoms against the end 44 it will have moved the recess means into its proper position so that its end walls 58 and 60 are properly aligned with the frusto-conical shoulders 54 and 28 of the variable volume chamber. The gasket seal will have deformed so as to push or deform the pipe P into the recess to completely fill the same with no extrusion of the plastic pipe. Then the plug 18 is threaded into the fitting and the fitting is connected to the service line at the point of use.

The terminology used in this specification is for the purpose of description and encompasses all of the modifications of the invention within the spirit and the scope of the following claims.

I claim:

1. An improvement in a service head adapter joint for connecting a new plastic service pipe to a fitting, the plastic service pipe telescoping through and having an end portion extending from an existing service pipe, the service head adapter joint comprising: a hollow body member having first means for connecting it to the existing pipe and a second means for connecting it to the fitting, said body member having a bore therethrough for receiving the end portion of the plastic pipe, said bore having an intermediate portion of a reduced diameter substantially equal to the outside diameter of the plastic pipe and through which the end portion thereof extends, said intermediate portion defining an outwardly flaring frusto-conical shoulder facing toward the end of the end portion of the plastic pipe; an elongated rigid tubular sleeve element having an exterior diameter substantially equal to the interior diameter of the end portion of the plastic pipe and having an annular recess means of an overall axial extent and uniform depth on its exterior surface; follower means having a passageway therethrough for communicating with the interior of the plastic pipe, said follower means including a follower nut threadidly received by said body member and adapted to bottom against the same and a sleeve-like member abutting the inner end of said follower nut whereby the sleeve-like member moves only axially when said follower nut is rotated and advanced axially, said sleeve-like member having an exterior diameter to fit within said bore and having an interior diameter for at least a portion of the same substantially equal to the outside diameter of the plastic pipe, said sleeve-like member fixedly supporting said tubular sleeve element and defining with said sleeve element an annular chamber for receiving the end portion of the plastic pipe, said sleeve-like member of said follower means terminating in a frusto-conical end surface opposed to and spaced from said frusto-conical shoulder of said body member to define therebetween a variable volume annular compression chamber having an initial axial length greater than the overall axial extent of said annular recess means on said sleeve element, said frusto-conical end surface of said sleeve-like member being positioned adjacent one end of said recess means of said sleeve element; and a substantially non-compressible annular gasket seal made of a deformable material and having an axial cross section which when relaxed is generally complementary to said compression chamber prior to volume of the same being reduced and having an axial extent greater than the axial extent of said annular recess means on said sleeve element, said follower nut being advanced until it bottoms on said body member with said sleeve-like member and said sleeve element being axially moved into said plastic pipe to a position where the other end of said recess means on said sleeve element is adjacent the frusto-conical shoulder of said body member and said gasket seal has deformed the plastic pipe into said annular recess means to completely fill the same without extrusion of the plastic pipe.

2. A service head adapter joint as claimed in claim 1 in which said recess means on the exterior surface of said sleeve element terminates in oppositely disposed frusto-conical end walls at its overall axial extent, the outer junctures of said end walls respectively lying substantaally in projections of said frusto-conical shoulder and said frusto-conical end surface when the joint is made up.

3. A service head adapter joint as claimed in claim 2 in which said recess means is defined by at least one annular recess.

4. A service head adapter joint as claimed in claim 1 including providing a lubricant means between the abutting surface of said follower nut and said sleeve-like member to thereby reduce friction between the same when said joint is being made up.

5. A service head adapter joint as claimed in claim 1 wherein said first means for connecting said hollow body member to the existing pipe includes interior threads along a portion of said bore for cooperating with threads on said existing pipe and wherein said second means for connecting said body member to the fitting includes exterior threads on said body member.

6. A service head adapter joint as claimed in claim 1 wherein said follower nut is exteriorly threaded and wherein said bore of said body member is interiorly threaded to receive the same, said follower nut being provided with an outwardly radially projecting portion for bottoming against the end of said body member.

7. An improvement in a service head adapter joint for connecting a new plastic service pipe to a fitting, the plastic service pipe telescoping through and having an end portion extending from an existing service pipe, the service head adapter joint comprising: a hollow body member having first means for connecting it to the existing pipe and a second means for connecting it to the fitting, said body member having a bore therethrough for receiving the end portion of the plastic pipe, said bore having an intermediate portion of a reduced diameter substantially equal to the outside diameter of the plastic pipe and through which the end portion thereof extends, said intermediate portion defining an outwardly flaring frusto-conical shoulder facing toward the end of the end portion of the plastic pipe; an elongated rigid tubular sleeve element having an exterior diameter substantially equal to the interior diameter of the end portion of the plastic pipe and having an annular recess means of an overall axial extent and uniform depth on its exterior surface; follower means having a passageway therethrough for communicating with the interior of the plastic pipe, said follower means being adapted to advance and bottom against said body member and including a sleeve-like member arranged to move only axially without rotation when said follower means is advanced, said sleeve-like member having an exterior diameter to fit within said bore and having an interior diameter for at least a portion of the same substantially equal to the outside diameter of the plastic pipe, said sleeve-like member fixedly supporting said tubular sleeve element and defining with said sleeve element an annular chamber for receiving the end portion of the plastic pipe, said sleeve-like member of said follower means terminating in a frusto-conical end surface opposed to and spaced from said frusto-conical shoulder of said body member to define therebetween a variable volume annular compression chamber having an initial axial length greater than the overall axial extent of said annular recess means on said sleeve element, said frusto-conical end surface of said sleeve-like member being positioned adjacent one end of said recess means of said sleeve element; and a substantially non-compressible annular gasket seal made of a deformable material and having an axial cross section which when relaxed is generally complementary to said compression chamber prior to volume of the same being reduced and having an axial extent greater than the axial extent of said annular recess means on said sleeve element, said follower means being advanced until it bottoms on said body member with said sleeve-like member and said sleeve element being axially moved into said plastic pipe to a position where the other end of said recess means on said sleeve element is adjacent the frusto-conical shoulder of said body member and said gasket seal has deformed the plastic pipe into said annular recess means to completely fill the same without extrusion of the plastic pipe.

* * * * *